Nov. 22, 1938. N. E. LINDENBLAD Re. 20,922

ANTENNA

Original Filed Sept. 7, 1928 4 Sheets-Sheet 1

INVENTOR.
NILS E. LINDENBLAD

BY H. S. Grover
ATTORNEY.

Nov. 22, 1938. N. E. LINDENBLAD Re. 20,922

ANTENNA

Original Filed Sept. 7, 1928 4 Sheets-Sheet 2

INVENTOR.
NILS E. LINDENBLAD

BY H. S. Grover

ATTORNEY.

ANTENNA

Original Filed Sept. 7, 1928 4 Sheets-Sheet 3

INVENTOR.
NILS E. LINDENBLAD

BY H. S. Grover

ATTORNEY.

ANTENNA

Original Filed Sept. 7, 1928 4 Sheets-Sheet 4

BY

INVENTOR.
NILS E. LINDENBLAD
H. S. Grover
ATTORNEY.

Reissued Nov. 22, 1938

Re. 20,922

UNITED STATES PATENT OFFICE 20,922

ANTENNA

Nils E. Lindenblad, Port Jefferson, N. Y., assignor to Radio Corporation of America, a corporation of Delaware Original No. 1,884,006, dated October 25, 1932, Serial No. 304,445, September 7, 1928. Application for reissue June 2, 1938, Serial No. 211,467

27 Claims. (Cl. 250—11)

This invention relates to antennae, and more particularly to directional antennae for the propagation or reception of short wave signals.

Several types of beam and projector antenna systems for short waves have been developed, but these are rather complicated in structure and therefore relatively expensive to erect and adjust, and also are structurally suitable only for the wave length for which they have been designed and built. It is the primary object of my invention to provide a simplified antenna which will be capable of accommodating a broad range of wave lengths, and to this end I have experimented very extensively with the problem of radiation from transmission lines, as a result of which I have devised an antenna consisting merely of simple linear conductors. The antenna is suitable both for transmission and reception, but for simplification I shall refer to transmission in the description which follows. Identical structure and theory may be applied to reception.

If a standing wave is caused on a linear conductor which is long, relative to the working wave length, the conductor may be considered as composed of successive half wave length linear oscillators connected end to end, in which case there will be no summation of energy nor radiation in an end-on direction because each of the half wave oscillators does not radiate along its axis. Furthermore, there is little or no radiation at right angles to the wire because although each half wave length oscillator might tend to radiate in this direction, the successive half wave length radiators are opposed in phase, so that at a distance from the wire the average effect is small or zero. However, there is radiation in a direction intermediate the normal and longitudinal directions, and with a single conductor, this radiation takes place in the form of hollow cones having common axes in the wire.

This is wasteful of energy, and one object of my invention is to reduce the conical radiation so that it will consist only of concentrated lobes having axes in one plane. This is accomplished by providing two collaterally spaced substantially parallel linear conductors which are long, relative to the working wave length, which are coupled in phase opposition, and which are so spaced apart as to concentrate the predominant radiation in the desired plane. Because of the opposed phase relation in the two conductors there is substantially no radiation normal to the plane of the conductors. By spacing them a proper distance apart, the radiation from the pair of conductors is concentrated, essentially, into conjugate pairs of oppositely directed lobes the axes of which lie in the plane of the conductors.

This arrangement, too, is wasteful of energy, and it is a further object of my invention to strengthen the radiation in one pair of opposite critical directions, while weakening the radiation in the conjugate pair of opposite critical directions, which I do by staggering the pair of wires, longitudinally, so that their ends make an angle with the transverse axis of the antenna equal to the critical angle of radiation, that is, the angle which the principal lobes of the radiation pattern of the antenna make with the longitudinal axis of the antenna. In this manner radiation in one pair of opposite directions from each of the conductors come on the same wave front at the same time, but being opposite in phase, they neutralize and cancel each other. In the conjugate directions, owing to the physical displacement of the conductors, the radiated energy may be made to add. To make this addition a maximum it is desirable that the added energies be combined exactly in phase, and to provide for this the spacing of the pair of wires should be such that the distance apart of corresponding points (such as the outer ends, illustrated as electrically open) on the two wires, measured in the direction of predominant radiation, is an odd number of half wave lengths.

The radiation has so far been reduced to a bidirectional radiation, and a further object of my invention is to make it unidirective, for which purpose I provide another pair of simple linear conductors arranged to form another antenna such as I have already described, spaced apart from the first antenna an odd number of quarter wave lengths in the direction of desired propagation, and energized in phase quadrature so that the entire system is made unidirective.

Instead of forced feeding of energy to the second antenna a pure reflector action may be employed, in which case only one of the pairs of conductors is energized, in the case of a transmitter, or connected to the receiving set, in the case of a receiver, while the other pair of conductors is properly tuned and spaced and staggered so as to provide reflector action by reason of the energy transferred thereto from the other pair of conductors.

It has already been mentioned that a pair of conductors may be so used as to cause the radiation to lie more nearly in a single plane, and in order to improve this characteristic a number of stories of antennae, such as I have already described, may be employed, each antenna consisting of conductors lying in a single plane, while the various antennae lie in vertically spaced parallel planes, and are coupled together so as to operate electrically in parallel. The spacing of these planes may be any spacing desired, particularly if a large number is used, but should preferably be a half wave length, especially when only two antennae are used.

To sharpen the directivity in azimuth a number of antennae may be used which are spaced apart in a horizontal direction, so as to present a broadside array.

A further object of my invention is to elevate the propagated wave, and this may be done either by arranging the antenna system with the linear conductors spaced apart in a horizontal direction, but with their plane tilted upwards in the direction of desired propagation, or by arranging all of the conductors so that they lie in a vertical plane, and are spaced apart vertically, and either lie horizontally in said plane, or at such an angle with the horizontal that the wave is propagated at the desired elevation. To then sharpen the directivity in azimuth a number of such antennae lying in horizontally spaced vertical planes may be used.

The invention is described more in detail in the following specification, which is accompanied by drawings in which Figures 1 and 2 are explanatory of my invention;

Figure 8:
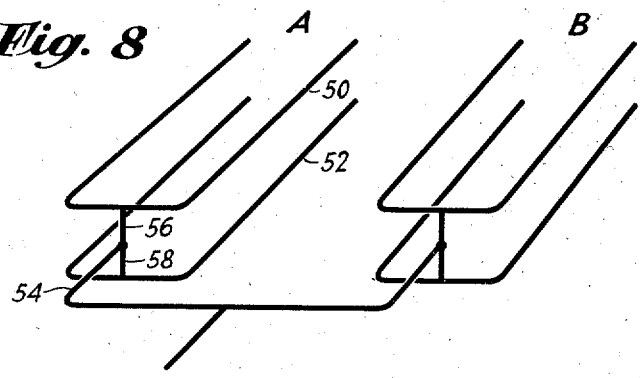
Figure 9:
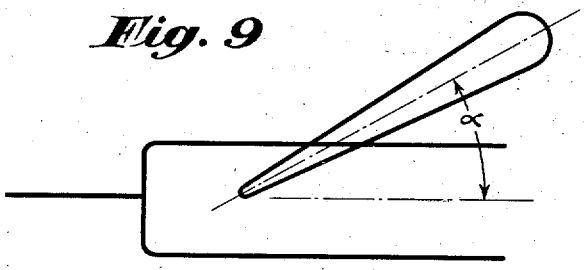
Figure 10:
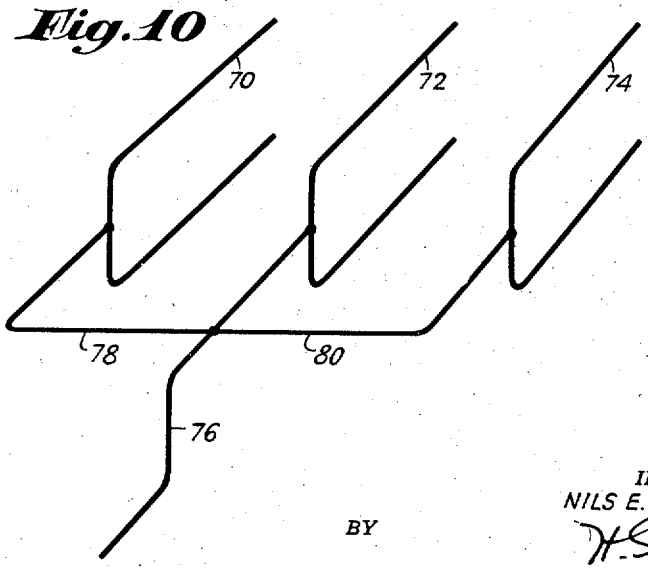

Figure 8 indicates schematically an antenna system employing a plurality of antennae spaced vertically and horizontally to increase directivity in elevation and in azimuth, respectively;

Figure 9 is a schematic representation of an antenna and reflector lying in a vertical plane to obtain elevated radiation; and Figure 10 indicates schematically a broadside array of antennae lying in vertical planes to increase the directivity in azimuth.

Figure 1:
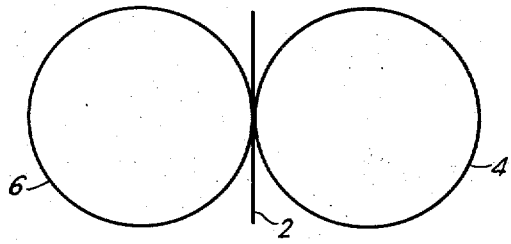

In Figure 1 there is shown a simple linear conductor 2 a half wave in length. The maximum radiation from this conductor takes place normally of the conductor, the pattern, in section, being a figure 8 such as is indicated by the lobes 4 and 6.

Figure 2:
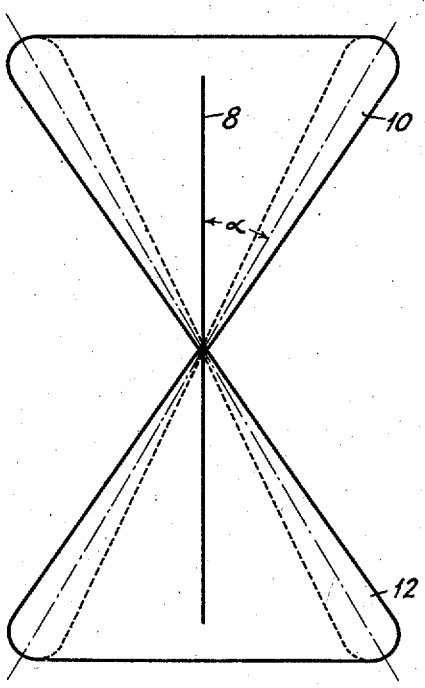

When a conductor which is long, relative to the wave length, is employed, and a standing wave is caused thereon, the radiation normal of the conductor is opposed in phase in the successive half wave length portions of the conductor, and consequently there is little or no radiation normally of the wire. There is no radiation endwise of the wire because although in this direction radiated energy would add favorably, there is no radiated energy to be added. The radiation takes place in an intermediate direction, and the principal radiation is indicated in Figure 2, in which there is a long conductor 8, on which a standing wave is caused, and from this conductor radiation takes place in conical lobes, such as the lobes 10 and 12. It will be seen from the figure that these lobes are in the form of hollow cones having their apices adjacent and located in the conductor. In actual practice it should be kept in mind that there will be a number of different cones of various lesser magnitudes, and lying in different directions, relative to the longitudinal axis of the antenna, but for the sake of simplicity only the principal radiation is indicated, and its direction is indicated by the angle $\alpha$.

Figure 3:
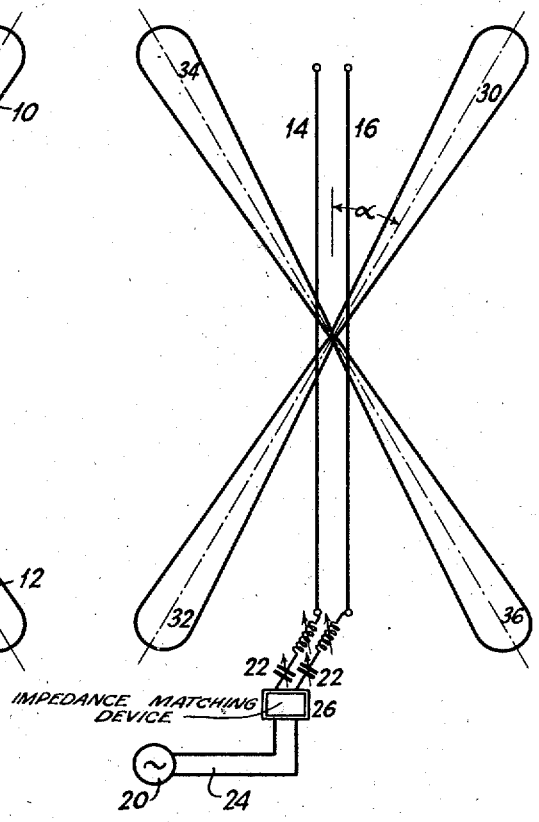
Figure 3 represents my antenna in simplest form.

Referring to Figure 3 it will be seen that there are a pair of long conductors 14 and 16, and that these are substantially parallel and collaterally spaced. The conductors are connected in phase opposition to the transmitter 20 through tuning reactances 22, the latter being adjusted to cause standing waves on the conductors 14 and 16 by making the total electrical length of the circuit around the two wires a whole number of half wave lengths. This number should be odd, in order that the open ends of the conductors may be opposite in polarity. It should be noticed that these wires preferably are left with open ends, as a simple expedient to favor the growth of standing waves. If the transmission line 24 which interconnects the transmitter and the antenna is long, so that standing waves thereon might tend to cause undesired radiation, the transmission line may be closed with an impedance matching device 26, so that standing waves exist only between the device 26 and the antenna, and not on the line 24.

In a direction normal to the plane of the conductors 14 and 16 radiation is cancelled because of the phase opposition of the energy in the conductors. When the wires are properly spaced apart, the hollow cones of radiation indicated in Figure 2 are reduced to four ears or lobes, the axes of which lie in the plane of the conductors. These lobes may be grouped into the oppositely directed lobes 30 and 32, and a conjugate pair of oppositely directed lobes 34 and 36. The direction of radiation here also makes an angle $\alpha$ with the longitudinal axis of the antenna.

Figure 4:
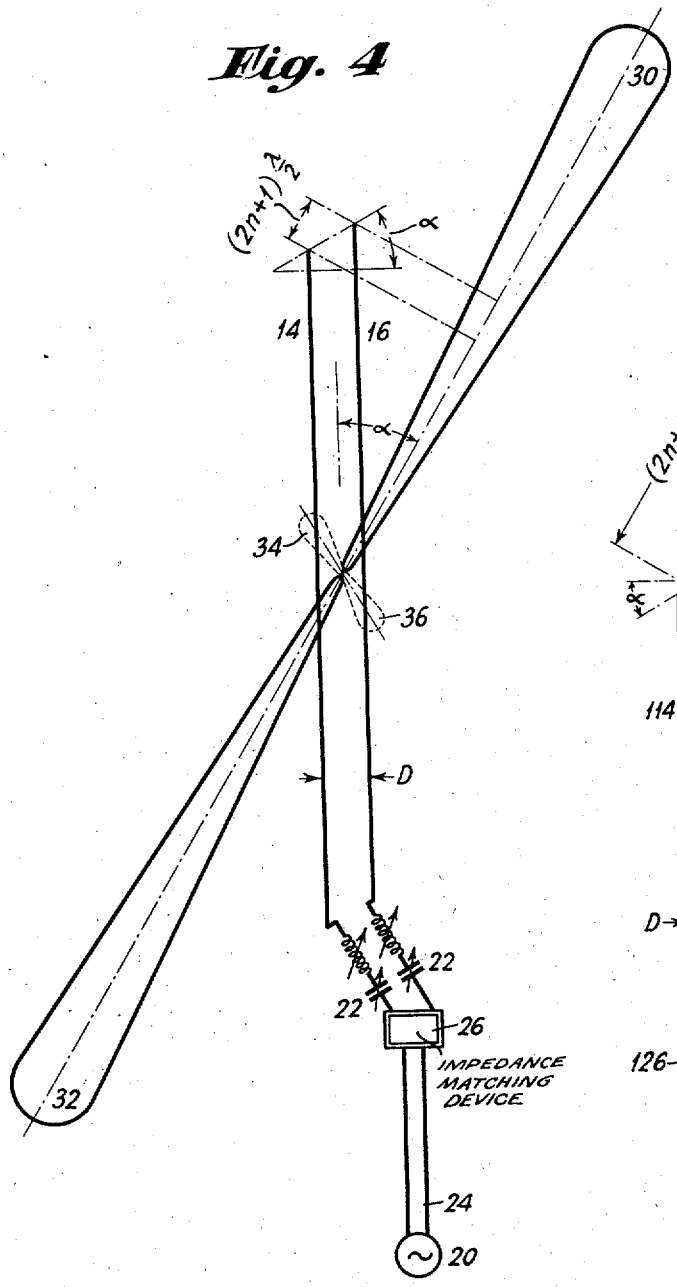
Figure 4 represents a bidirective antenna constructed in accordance with my invention.

Referring to Figure 4 it will be seen that the arrangement there disclosed is quite similar to that shown in Figure 3 except that the conductors 14 and 16 have been staggered, longitudinally, so that their ends make an angle $\alpha$ with the transverse axis of the antenna. This causes the radiation corresponding to the lobes 34 and 36 in Figure 3 to come on the same wave front at the same time, and being opposed in phase, the radiation is practically cancelled, making the antenna bidirective, in the direction of the lobes 30 and 32, which are correspondingly strengthened, for radiation in this direction may be made to be additive by proper displacement of the conductors. The transverse spacing of the conductors is indicated by the dimension D, and should be such, preferably, that when multiplied by the sine of the angle of radiation $\alpha$, the product will equal an odd number of quarter wave lengths, for in this case the predominant radiation from the two conductors will combine exactly in phase. This spacing is indicated in Figure 4 in terms of the distance apart—namely, an odd number of half wave lengths measured in the direction of predominant radiation—of corresponding points (such as the outer ends) on each wire. In the formulae given in connection with Figures 4, 5, and 7 of the drawings, $n$ is zero or any whole number and $\lambda$ is the operating wave length.

It is slightly desirable, but not essential, that the spacing D be one or more whole wave lengths, in which case radiation transversely of the antenna will be effectually prevented, but this condition can only be met for certain special cases of the angle $\alpha$, and is not important, owing to the fact that each wire is essentially non-radiative in a normal direction.

Figure 5:
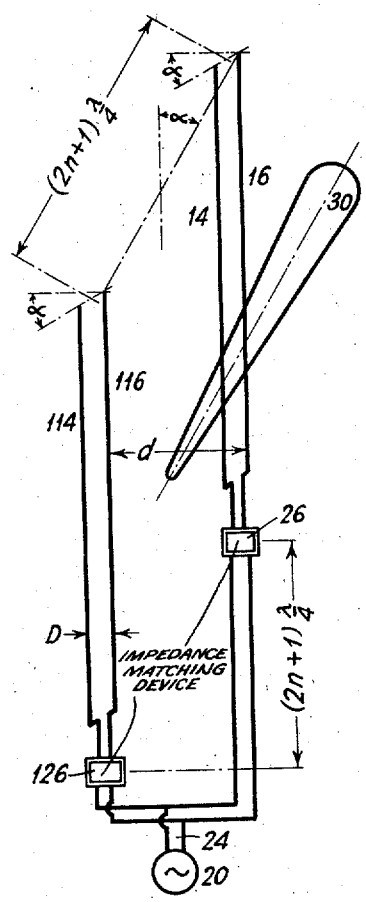
Figure 5 is a unidirective antenna employing an energized reflector.

Referring now to Figure 5 it will be seen that there are two pairs of collaterally spaced conductors, 14, 16 and 114, 116, and each of these pairs is arranged in accordance with the principles set forth in connection with Figure 4. The pairs of antennae are energized in parallel through a branched transmission line system, and the feed is made such that the antennae are energized in phase quadrature. This may be obtained most simply by having the arms of the branched transmission line differ in length by an odd number of quarter wave lengths, as has been indicated in the drawings, this difference in length being introduced ahead of the impedance matching devices, so that it exists in lines on which there is a travelling wave, rather than a standing wave. The pairs of conductors are spaced apart a distance $d$, and this distance is such that when multiplied by the cosecant of the angle of principal radiation $\alpha$, the product will be an odd number of quarter wave lengths, so that owing to the initial phase difference in the energization of the antennae, the radiated energy in one of the opposite directions, as 30, adds, while in the opposite direction the energies are opposed, and cancel, thereby making the antenna unidirective, instead of bidirective.

The arrangement shown in Figure 5 employs an energized or forced feed reflector, which may be called a director, but it is also possible to use a simple tuned reflector energized from the other pair of conductors. In this case it is desirable to have the reflector near the energized conductors, and in such case the arrangement preferably is slightly modified as in Figure 6, in which the pair of conductors 14 and 16 corresponds to the similarly numbered pair in the preceding figures, while the appropriate reflector wires are numbered 214 and 216. As before, the ends of the conductors 14 and 16 are staggered so as to make an angle $\alpha$ with the transverse axis of the antenna, and the same applies to the reflecting conductors 214 and 216. Also, as before, the distance D is so chosen that when multiplied by the sine of the angle $\alpha$ the product will equal an odd number of quarter wave lengths, so that radiation in the direction of principal radiation will be added as nearly as possible in phase, and furthermore, the distance D may, if desired, be made one or more whole wave lengths where the angle $\alpha$ permits this positioning. The conductors 14 and 16 are energized in phase opposition from a transmitter 20, and if desired, an impedance matching device 26, and tuning means 22, may be employed. The conductors 214 and 216 are coupled in phase opposition, and are provided with a tuning means 222, here illustrated as a trombone slide, so that the reflector may be tuned to favor the production of standing waves.

The problem of the spacing and of the stagger of the reflector conductors, relative to the conductors 14 and 16, is not so simple as in the preceding case. If energy were induced in the conductor 216, from the conductor 16, only along the line of direction of principal radiation, as indicated by the dotted arrow 40, the rule would be to make this distance a quarter wave, so that the reflected energy would combine in phase with the energy radiated from the conductor 16 in one direction, and out of phase in the opposite direction. The situation is complicated by the fact that energy is induced in the conductor 216 from the conductor 16 along the shorter normal path, indicated by the arrow 42, and from the conductor 14, indicated by the arrow 44, so that the phase and magnitude of the current in the reflector is the resultant of several factors. The best arrangement may be found by experiment.

Figure 6:
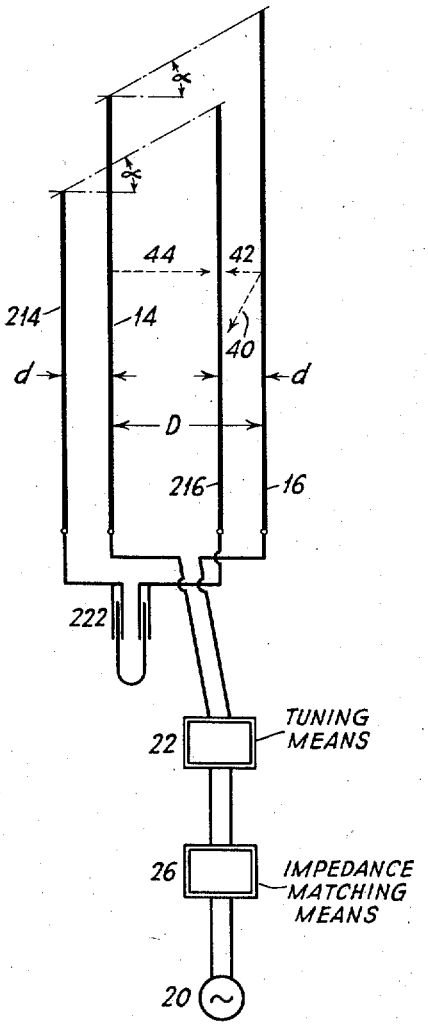
Figure 6 is a unidirective antenna employing a tuned reflector.
Figure 7:
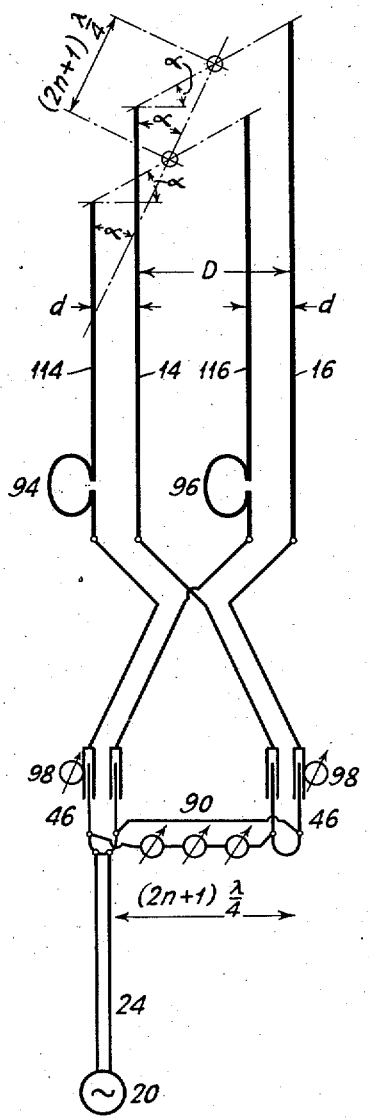
Figure 7 is a modification of Fig. 5.

In Figure 7 there is an energized director 114, 116, as in Fig. 5, but the spacing $d$ between the antenna and the director antenna is made less than the spacing D between the conductors of the antennae as in Fig. 6. Another feature of this modification is the use of the trombone slides 46 and 48 to tune the antennae. This tuning need not be great in range, though the antenna structure will cover a great wave length range, because the adjustment can be made for a different number of half waves in length, whenever necessary to accommodate a desired wave length. The transmitter 20 is coupled to the antennae through a transmission line 24, which is coupled to the trombone slide 46 at points so spaced that the impedance of the line is matched. The trombones 46 are interconnected by a line 90, the ends of which are coupled to the trombone slides at points so spaced that the impedance of the line is matched, so that there is a travelling rather than a standing wave on the line. In this manner the line may be used to introduce a phase change, and is made one, three or five etc., quarter waves in length to obtain phase quadrature in the antennae. Three meters, 92, are inserted along a quarter wave portion of the line, and are made to read alike when the line is properly adjusted.

The conductors 114 and 116 are lengthened by the addition of the loops 94 and 96, so as to equal the conductors 14 and 16 in length. With this precaution the antennae should both take equal current. Ammeters 98, shunted to the trombone slides 46, are made to read alike, and at a maximum, when the antenna is properly adjusted.

In connection with Figure 3, and the succeeding figures, it has been pointed out that the radiation takes place principally in the plane of the conductors, and in order to sharpen this characteristic antennae, such as have already been described, may be located above one another in parallel planes, so as to make a multiple storied antenna. This has been indicated in A, of Figure 8, in which an entire antenna, consisting of a pair of conductors, and either an energized or non-energized pair of reflecting conductors, properly staggered, and lying in a single plane, is schematically indicated by the U shaped line 50. Another such antenna system, lying in a parallel plane, is indicated at 52, and these are fed electrically in parallel through a branched transmission line system, schematically indicated by the single lines 54, 56 and 58. The spacing should preferably be a half or odd number of half wave lengths, so as to provide complete cancellation in an up and down direction. With this type of antenna the structure is arranged at an angle $\alpha$, in azimuth, relative to the direction in which radiation is desired. If it is desired to sharpen the directivity in this direction, i. e. in azimuth, a plurality of antennae may be arranged in broadside, and fed cophasially, as is indicated by the antenna systems A and B in Fig. 8. If elevated radiation is desired, the planes in which each antenna lies must be correspondingly tilted or elevated away from a truly horizontal direction. The antennae so far described provide horizontal polarization.

By positioning the plane of an antenna consisting of two pairs of conductors, such as has already been described in connection with Figures 5, 6, and 7, in a vertical plane, as is indicated in Figure 9, radiation with vertical polarization may be provided. In this case the antenna is directed in the direction of desired propagation in azimuth, and the angle $\alpha$ provides the angle of elevation. This arrangement is desirable because the elevated radiation is obtained without the expense of an elaborate supporting structure for holding the antenna at the corresponding angle. Slight changes in the angle of elevation may be made by slightly changing the position of the conductors, relative to the horizontal, while keeping them in a vertical plane.

In order to sharpen the directivity in azimuth a number of antennae, located in parallel planes, may be provided as has been indicated in Figure 10, in which each of the antennae 70, 72, and 74 is an antenna such as has been described in either of Figures 5, 6, or 7, and the various antennae are energized electrically in parallel through a branched transmission line system 76, 78, 80. The branches are so arranged that the antennae are energized cophasially, and the antennae are preferably spaced a half wave apart, but may be at any spacing, especially when a considerable number antennae are employed. This antenna system propagates a vertically polarized elevated wave.

Over a considerable range of tuning the angle $\alpha$ remains quite constant. Only by changing the wave length so greatly that the character of the long wire is completely changed so as to be a relatively few instead of many waves in length, does that lobe of radiation which is greatest in magnitude shift or jump from one to another, so as to definitely and considerably change the angle of radiation $\alpha$. For example, using conductors approximately eight mean waves in length I have varied the tuning from about five to seven meters without appreciably changing the angle of radiation. The antenna is tuned, but the antenna structure itself need not be changed. The tuning is small in amount because it is needed only to bring the total electrical length to the nearest odd number of half waves, rather than to a fixed length.

I claim:

1. A directional antenna comprising a collaterally spaced pair of simple linear conductors adapted to have standing waves formed thereon which are long, relative to the working wave length, and means energizing said conductors in phase opposition at adjacent ends of said conductors, said conductors lying on the same side of said energizing means and extending away from said energizing means whereby radiant action occurs predominantly in a direction making equal angles greater than zero degrees with reference to said conductors.

2. A directional antenna comprising a collaterally spaced pair of substantially parallel simple linear conductors adapted to have standing waves formed thereon which are long, relative to the working wave length, and means energizing said conductors in phase opposition, said conductors lying on one side of and extending away from said energizing means, radiant action occurring predominantly in a direction making equal angles greater than zero degrees with reference to said conductors.

3. A directional antenna comprising a collaterally spaced pair of substantially parallel simple linear conductors which are long, relative to the working wave length, means coupling said conductors in phase opposition, and means for tuning said conductors and coupling means to an overall electrical length of an odd number of half waves, so as to cause standing waves of opposite polarity on the conductors.

4. A directional antenna comprising a collaterally spaced pair of simple linear conductors which are long, relative to the working wave length, and which are so staggered, longitudinally, that radiation in one pair of opposite critical directions is strengthened, while radiation in the conjugate pair of opposite critical directions is weakened, and means coupling said wires in phase opposition.

5. A directional antenna comprising a collaterally spaced pair of substantially parallel simple linear conductors which are long, relative to the working wave length, and which are so staggered, longitudinally, that radiation in one pair of opposite critical directions is strengthened, while radiation in the conjugate pair of opposite critical directions is weakened, means coupling said conductors in phase opposition, and means for tuning said conductors and coupling means to an overall electrical length of an odd number of half waves, so as to cause standing waves of opposite polarity on the conductors.

6. A directional antenna comprising two pairs of collaterally spaced simple linear conductors all lying in the same plane, the conductors in each of said pairs of conductors being long, relative to the working wave length, and so staggered, longitudinally, that radiation in one pair of opposite critical directions is strengthened, while radiation in the conjugate pair of opposite critical directions is weakened, said pairs of conductors being so staggered and spaced apart in the direction of principal radiation as to make the antenna unidirectional, means coupling the pairs of conductors in phase opposition, and means coupling at least one of the pairs of conductors with radio equipment.

7. A directional antenna system comprising two pairs of collaterally spaced and substantially parallel simple linear conductors all lying in the same plane, each conductor being long, relative to the working wave length, the conductors in each pair being so staggered, longitudinally that radiation in one pair of opposite critical directions is strengthened, while radiation in the conjugate pair of opposite critical directions is weakened, means coupling the conductors in each pair in phase opposition, means for tuning said conductors and coupling means to an overall electrical length of an odd number of half waves, so as to cause standing waves of opposite polarity on the conductors in each pair, said pairs of conductors being so spaced apart in the direction of principal radiation as to make the antenna unidirective, and means coupling at least one of the pairs of conductors with radio equipment.

8. A directional antenna system comprising two pairs of collaterally spaced and substantially horizontal parallel simple linear conductors all lying in the same vertical plane, each conductor being long relative to the working wave length, the conductors in each pair being so staggered, longitudinally, that radiation in one pair of opposite critical directions is strengthened, while radiation in the conjugate pair of opposite critical directions is weakened, means coupling the conductors in each pair in phase opposition, means for tuning said conductors and coupling means to an overall electrical length of an odd number of half waves, so as to cause standing waves of opposite polarity on the conductors in each pair, said pairs of conductors being so spaced apart in the direction of desired radiant action as to make the antenna unidirective, and means coupling at least one of the pairs of conductors with radio equipment.

9. A directive transmission system comprising two pairs of collaterally spaced simple linear conductors all lying in the same plane, the conductors in each of said pairs of conductors being long, relative to the working wave length, and so staggered, longitudinally, that radiation in one pair of opposite critical directions is strengthened, while radiation in the conjugate pair of opposite critical directions is weakened, said pairs of conductors being so staggered and spaced apart in the direction of principal radiation as to make the antenna unidirectional, means coupling the pairs of conductors in phase opposition, a radio transmitter for energizing the conductors, and means coupling the transmitter to at least one of the pairs of conductors in phase opposition.

10. A directive transmission system comprising two pairs of collaterally spaced and substantially parallel simple linear conductors all lying in the same plane, each conductor being long, relative to the working wave length, the conductors in each pair being so staggered, longitudinally, that radiation in one pair of opposite critical directions is strengthened, while radiation in the conjugate pair of opposite critical directions is weakened, means coupling the conductors in each pair in phase opposition, means for tuning said conductors and coupling means to an overall electrical length of an odd number of half waves, so as to cause standing waves of opposite polarity on the conductors in each pair, said pairs of conductors being so spaced apart in the direction of principal radiation as to make the antenna unidirective, a radio transmitter for energizing the conductors, and means coupling the transmitter to said pairs of conductors in phase quadrature.

11. A directional antenna system including a plurality of unidirectional antennæ lying in spaced parallel planes, each antenna comprising two pairs of collaterally spaced and substantially parallel simple linear conductors lying in a single plane, the conductors being long, relative to the working wave length, the conductors in each of said pairs being so staggered, longitudinally, that radiation in one pair of opposite critical directions is strengthened, while radiation in the conjugate pair of opposite critical directions is weakened, means coupling the conductors in each pair in phase opposition, means for tuning said conductors and coupling means to an overall electrical length of an odd number of half waves, so as to cause standing waves of opposite polarity on the conductors in each pair, said pairs of conductors being so staggered and spaced apart in the direction of principal radiation as to make the antenna unidirectional, and means coupling corresponding pair of conductors in each of the antennæ in parallel and in proper phase to radio equipment.

12. A unidirectional antenna system including a plurality of unidirectional antennæ lying in spaced parallel vertical planes, each antenna comprising two pairs of collaterally spaced and substantially horizontal parallel simple linear conductors lying in a single plane, said planes being spaced transversely of the antenna so as to sharpen the directivity in azimuth, the conductors being long relative to the working wave length, the conductors in each of said pairs being so staggered, longitudinally, that radiation in one pair of opposite critical directions is strengthened, while radiation in the conjugate pair of opposite critical directions is weakened, means coupling the conductors in each pair in phase opposition, means for tuning said conductors and coupling means to an overall electrical length of an odd number of half waves, so as to cause standing waves of opposite polarity on the conductors in each pair, said pairs of conductors being so staggered and spaced apart in the direction of principal radiation as to make the antenna unidirectional, and means coupling corresponding pairs of conductors in each of the antennæ in parallel and in proper phase to radio equipment.

13. A directive transmission system including a plurality of unidirective antennae lying in spaced parallel planes, each antenna comprising two pairs of collaterally spaced and substantially parallel simple linear conductors lying in a single plane, the conductors being long, relative to the working wave length, the conductors in each of said pairs being so staggered, longitudinally, that radiation in one pair of opposite critical directions is strengthened, while radiation in the conjugate pair of opposite critical directions is weakened, means coupling the conductors in each pair in phase opposition, means for tuning said conductors and coupling means to an overall electrical length of an odd number of half waves, so as to cause standing waves of opposite polarity on the conductors in each pair, said pairs of conductors being so staggered and spaced apart in the direction of principal radiation as to make the antenna unidirectional, a radio transmitter for energizing said antennae and means coupling corresponding pairs of conductors in each of said antennae in parallel and in proper phase to the radio transmitter.

14. A unidirectional short wave antenna comprising four collaterally spaced substantially parallel wires which are long, relative to the working wave length, all lying in a single plane, means for coupling pairs of the wires in phase opposition, means for tuning the pairs of wires to an odd number of half waves in total electrical length so as to cause standing waves of opposite polarity thereon, the wires in each pair being so staggered longitudinally that their ends form the same angle, relative to the transverse axis of the antenna, that the direction of principal radiation makes with the longitudinal axis of the antenna, and so spaced apart that corresponding points on the two wires of each pair are separated by an odd number of half wave lengths in the direction of principal radiation, the pairs of conductors being so staggered and spaced apart that energy from one pair combines with the energy from the other pair in phase so as to make the antenna unidirectional, and radio equipment coupled to at least one of the pairs of conductors.

15. A unidirectional short wave antenna comprising four collaterally spaced substantially parallel wires which are long, relative to the working wave length, all lying in a single plane, a pair of trombone slides for coupling together pairs of the wires and for tuning them to an odd number of half waves in total electrical length so as to cause standing waves of opposite polarity thereon, the wires in each pair being so staggered longitudinally that their ends form the same angle, relative to the transverse axis of the antenna, that the direction of principal radiation makes with the longitudinal axis of the antenna, and so spaced apart that corresponding points on the two wires of each pair are separated by an odd number of half wave lengths in the direction of principal radiation, the pairs of conductors being spaced apart a quarter wave length in the direction of principal radiation, a transmission line a quarter wave in length coupled to the trombone slides at points so spaced that the impedance therebetween matches the impedance of the transmission line, and radio equipment coupled to one of the trombone slides.

16. A directional antenna comprising a collaterally spaced pair of simple linear conductors which are long, relative to the working wave length, and which are so staggered, longitudinally that wave action in one pair of opposite critical directions is strengthened, while wave action in the conjugate pair of opposite critical directions is weakened, and means for energizing said wires in phase opposition.

17. A directional antenna comprising a collaterally spaced pair of simple linear conductors which are long relative to the working wave length, and which are so staggered, longitudinally, that electromagnetic action in one pair of opposite critical directions is strengthened, while electromagnetic action in the conjugate pair of opposite critical directions is weakened, said wires adapted to be energized in phase opposition.

18. A directional antenna comprising a collaterally spaced pair of substantially parallel simple linear conductors which are long, relative to the working wave length, and which are so staggered, longitudinally, that wave action in one pair of opposite critical directions is strengthened, while wave action in the conjugate pair of opposite critical directions is weakened, said conductors adapted to be energized in phase opposition, means for actionally coupling the conductors, and means for tuning said conductors and coupling means to an overall electrical length of an odd number of half waves, so as to cause standing waves of opposite polarity on the conductors.

19. A directional antenna comprising two pairs of collaterally spaced simple linear conductors all lying in the same plane, the conductors in each of said pairs of conductors being long, relative to the working wave length, and so staggered, longitudinally, that electro-magnetic action in one pair of opposite critical directions is strengthened, while electro-magnetic action in the conjugate pair of opposite critical directions is weakened, said pairs of conductors being so staggered and spaced apart in the direction of principal electromagnetic action as to make the antenna unidirectional, means coupling the pairs of conductors in phase opposition, and means coupling at least one of the pairs of conductors with radio equipment.

20. A directional antenna system comprising two pairs of collaterally spaced and substantially parallel simple linear conductors all lying in the same plane, each conductor being long, relative to the working wave length, the conductors in each pair being so staggered, longitudinally, that radiant action in one pair of opposite critical directions is strengthened, while radiant action in the conjugate pair of opposite critical directions is weakened, means coupling the conductors in each pair in phase opposition, means for tuning said conductors and coupling means to an overall electrical length of an odd number of half waves, so as to cause standing waves of opposite polarity on the conductors in each pair, said pairs of conductors being so spaced apart in the direction of desired radiant action as to make the antenna unidirective, and means coupling at least one of the pair of conductors with radio apparatus.

21. A directional antenna comprising a pair of long linear wires connected at adjacent ends to high frequency apparatus and having standing waves of opposite instantaneous polarity thereon, said wires being several wave lengths in length and extending away from and on one side only of said adjacent ends.

22. A directional antenna system comprising a pair of long straight wires and means at adjacent ends of the wires for exciting the wires in phase opposition whereby standing waves of opposite instantaneous polarity are set up on the wires, said wires being several wave lengths in length at the operating frequency and extending on one side only and away from said adjacent ends.

23. A directive antenna system for propagating or receiving propagated electro-magnetic waves comprising a pair of substantially straight conductors, long, relative to the working wave length such that several standing waves at the operating frequency are set up on each conductor, said conductors being arranged so that radiant action occurs in a direction making the same angle with each conductor, and means coupling said conductors in phase opposition, said conductors lying in the same plane and extending away from said coupling means on one side only thereof.

24. A directive antenna system for propagating or receiving electromagnetic waves as claimed in claim 23 wherein a similar pair of conductors is provided, the conductors of said similar pair being arranged parallel to the respective conductors of the first pair whereby the directional effect of the system is augmented.

25. A directive antenna system for propagating or receiving electromagnetic waves as claimed in claim 23 wherein a similar pair of conductors is provided, the conductors of said similar pair being arranged parallel to the respective conductors of the first pair and lying in the same plane as the plane of the first pair whereby the directional effect of the system is augmented.

26. A directive antenna system for propagating or receiving electromagnetic waves as claimed in claim 23 wherein a similar pair of conductors is provided, the conductors of said similar pair being arranged parallel to the respective conductors of the first pair and lying in a plane parallel to the plane of said first pair whereby the directional effect of the system is augmented.

27. A directive antenna system for propagating or receiving propagated electromagnetic waves, comprising a plurality of pairs of conductors arranged in the same plane, respective conductors of the pairs being substantially parallel, each of said conductors being long relative to the working waves length and adapted to have a plurality of standing waves at the working wave length set up thereon, means for connecting the conductors of each pair in phase opposition, the conductors of each pair extending on one side only and away from said connecting means, and, a like number of pairs of conductors arranged in a plane parallel to the plane of said first mentioned plurality of pairs of conductors, the conductors in the like plurality of pairs being arranged parallel to the conductors of said first mentioned plurality of pairs, the conductors of said like pairs being coupled and arranged in a manner similar to the conductors of said first mentioned pairs of conductors, like conductors of the pairs being arranged in parallel fashion, whereby radiant action occurs predominantly in a direction making equal angles greater than zero degrees with each conductor of said system.

NILS E. LINDENBLAD.